United States Patent [19]

Russ et al.

[11] Patent Number: 5,680,326
[45] Date of Patent: Oct. 21, 1997

[54] SYSTEM AND METHOD THEREFOR OF ESTIMATING OPTIMAL SPARE CAPACITY FOR A DISTRIBUTED RESTORATION SCHEME

[75] Inventors: Will Russ, Dallas; Mark Wayne Sees, Plano; Lee Dennis Bengston, Murphy; Clinton Allen Wagner, Allen, all of Tex.

[73] Assignee: MCI Corporation, Washington, D.C.

[21] Appl. No.: 493,477

[22] Filed: Jun. 22, 1995

[51] Int. Cl.⁶ .................................................... G06F 17/00
[52] U.S. Cl. ........................................................... 364/514 R
[58] Field of Search ......................... 364/514 R, 242.94; 395/200.1, 200.11, 182.02; 379/221, 220; 370/16, 16.1

[56] References Cited

U.S. PATENT DOCUMENTS

| | | | |
|---|---|---|---|
| 4,432,051 | 2/1984 | Bogaert | 364/DIG. 1 |
| 5,058,105 | 10/1991 | Mansour et al. | 370/16 |
| 5,182,744 | 1/1993 | Askew et al. | 370/16 |
| 5,253,161 | 10/1993 | Nemirovsky et al. | 370/16 |
| 5,303,166 | 4/1994 | Amalfitano et al. | 364/551.01 |
| 5,435,003 | 7/1995 | Chng et al. | 395/182.02 |
| 5,437,015 | 7/1995 | Iki | 364/DIG. 1 |
| 5,495,471 | 2/1996 | Chow et al. | 370/16 |
| 5,521,972 | 5/1996 | Iki | 379/221 |

OTHER PUBLICATIONS

Sakauchi et al; "A Self–Healing Network with an Economical Spare Channel Assignment" IEEE 1990.
Venables et al; "Two Strategies for Spare Capacity Placement in Mesh Restorable Networks" IEEE 1993.
Gover et al; "Near Optimal Spare Capacity Planning in a Mesh Restorable Network"; IEEE 1991.
Veerasamy et al; "Spare Capacity Assignment in Telecom Networks Using Path Restoration" IEEE 1995.

*Primary Examiner*—Ellis B. Ramirez

[57] ABSTRACT

To estimate an optimal amount of spare capacity for a network so that efficient distributed restoration of the network can take place in the event of a network failure, parameter assumptions and network design guidelines are provided to a network modeling tool to generate a desirable amount of spare links for the network. The spare links are allocated to the different nodes of the network. After a failure in the network, the result of the restoration of the network due to the failure is reported to the controller of the system. If necessary, the parameter assumptions and network design guidelines are updated and fed back to the network modeling tool for further refining the spare capacity of the network. An optimal amount of spare capacity is thus achieved by a continuous redeployment of the spare capacity output provided by the network modeling tool. Simulated failures and subsequent restorations of the network are provided to an exerciser periodically. Results from the exerciser further enhance the operations of the network modeling tool to provide an optimal amount of spare capacity for the telecommunications network.

13 Claims, 3 Drawing Sheets

SYSTEM AND METHOD THEREFOR OF ESTIMATING OPTIMAL SPARE CAPACITY FOR A DISTRIBUTED RESTORATION SCHEME

RELATED APPLICATIONS

This invention is related to an application by Russ et al. entitled "Automated Path Verification for SHN-Based Restoration", to be assigned to the same assignee as the instant invention and filed on Jun. 7, 1995 having Ser. No. 08/483,525. This invention is also related to an application by Will Russ entitled "System and Method for Resolving Substantial Bi-directional Requests of Spare Capacity", to be assigned to the same assignee as the instant invention and filed on Jun. 7, 1995 having Ser. No. 08/483,578. This invention is furthermore related to an application by W. Russ entitled "Automated Restoration of Unrestored Link and Nodal Failures", to be assigned to the same assignee as the instant invention and filed on Jun. 7, 1995 having Ser. No. 08/483,579. This invention is still furthermore related to an application by J. Shah entitled "Method and System for Identifying Fault Locations in a Communications Network", to be assigned to the same assignee as the instant invention and filed on Jun. 7, 1995 having Ser. No. 08/481,984. This invention is yet furthermore related to an application by Russ et al. entitled "Method and System for Resolving Contention of Spare Capacity Circuits of a Telecommunications Network", to be assigned to the same assignee as the instant invention and filed on Jun. 6, 1995 having Ser. No. 08/468,302. The disclosures of the above-noted related applications are incorporated by reference herein.

FIELD OF THE INVENTION

The present invention relates to distributed restoration schemes for disrupted telecommunications networks and more particularly relates to a system and method therefor of determining the optimal spare capacity to be allocated to a given telecommunications network for further enhancing the distributed restoration of the network when a fault occurs therein.

BACKGROUND OF THE INVENTION

A self healing network (SHN) distributed restoration algorithm (DRA) requires that spare circuits or links be provided for a telecommunications network so that, in the event a fault occurs at a link or a span connecting adjacent nodes in the network, the disrupted traffic is rerouted from the malfunctioned link or span.

Prior to the instant invention, in most of the existing restoration schemes, an assumption is made that a predetermined number of spare links be provided between adjacent or custodial nodes throughout the network. For example, in addition to the working link(s) connecting two adjacent or adjoining nodes, there may be provided between those same nodes a predetermined number of spare links for rerouting the traffic between those nodes if a fault occurred in a link or span somewhere in the communications network, and those nodes were deemed to be part of an alternative (or alt) route by the sender and chooser nodes that bracket the realfunctioned link. However, the arbitrary provisioning of the same predetermined number of spare links between adjacent nodes fails to take into account that different amounts of traffic may travel between different nodes. For example, the amount of traffic traversing between a node located at New York and a node located at Washington, D.C. typically can be assumed to have a greater volume than the traffic traversing between nodes connecting Wyoming and S.Dak.

Yet in order to provide a dependable network, there must be sufficient spare capacity available for rerouting traffic if a fault does occur anywhere within the network. At the same time, however, there is also a need to balance the reliability of the network against real world economic considerations. For example, it is always possible to connect more than enough spare links between adjacent nodes so as to provide close to a 100% accuracy for restoration of traffic between the adjacent nodes. However, this excessive placement of spare capacity throughout the network comes at an enormous price, as in most instances the excess spare capacity just sits idle for lack of use. An example of such inefficient utilization of spare capacity is one where there are five spare links for every three working links between adjacent nodes.

A need therefore arises for the management of the network to provide a system, and method therefor, for generating an optimal amount of spare capacity for a telecommunications network with a given number of nodes and a predefined amount of traffic traversing therethrough.

There is also a further need that this optimization spare capacity scheme be effected on a continuous basis because of the constant rerouting of traffic through the various nodes due to changing traffic patterns.

BRIEF SUMMARY OF THE INVENTION

To provide an optimal amount of spare capacity for a telecommunications network, a spare capacity planning tool such as for example a network modeling tool is utilized. Taking predetermined engineering and design guidelines into consideration, the planning tool calculates the amount of spare capacity required for a network having a given topology of nodes and links, and a predefined amount of traffic traveling therethrough. Once a first determination has been made of the required amount of spare capacity for the network, that spare capacity is allocated, either manually or automatically according to the topology of the network, among the different nodes in what is perceived to be the most optimal configuration. Once the network has thus been configured with the spare capacity, the controller of the system will wait for a result from a restoration event, an actual event in which a fault had occurred in the network, or a result from an exerciser enacting a simulation event, and use that result to determine whether the earlier calculated amount of spare links and the allocation of those spare links were done optimally. To refine the spare capacity allocation, results from multiple simulation events are used.

The control system of the instant invention, upon receiving the result from either the simulation or actual restoration event, makes a determination on whether the spare capacity previously configured is optimal. If it is not, the control system makes a further determination on whether it needs to change some parameter assumptions or network designed guidelines, or update the topology of the network. Irrespective of which of the choices is chosen, the central processor outputs a feedback to the network modeling tool so that the tool can further calculate the allocation of spare capacity within the network.

By providing a feedback to the network modeling tool, the estimation of the optimal amount of spare capacity and its allocation within the network are continually updated so that an optimal amount of spare capacity is constantly maintained for the network despite its ever changing nature. Accordingly, an efficient distributed restoration of disrupted traffic can be carried out without an excess of spare capacity. The instant invention system is controlled by the management of the telecommunications network.

An objective of the present invention is therefore to provide an optimal estimation of the spare capacity for a telecommunications network.

It is another objective of the present invention to provide a continually updated optimal estimation of the spare capacity of the network in response to the dynamic nature of the network.

It is yet another objective of the present invention to provide the management of a telecommunications network the ability to allocate the spare capacity of the network in response to changes in the network due to, for example, a fault in the network.

BRIEF DESCRIPTION OF THE DRAWINGS

The above mentioned objectives and advantages of the present invention will become apparent and the invention itself will be best understood by reference to the following description of an embodiment of the invention taken in conjunction with the accompanying drawings, wherein.

DETAILED DESCRIPTION OF THE PRESENT INVENTION

Figure 1:
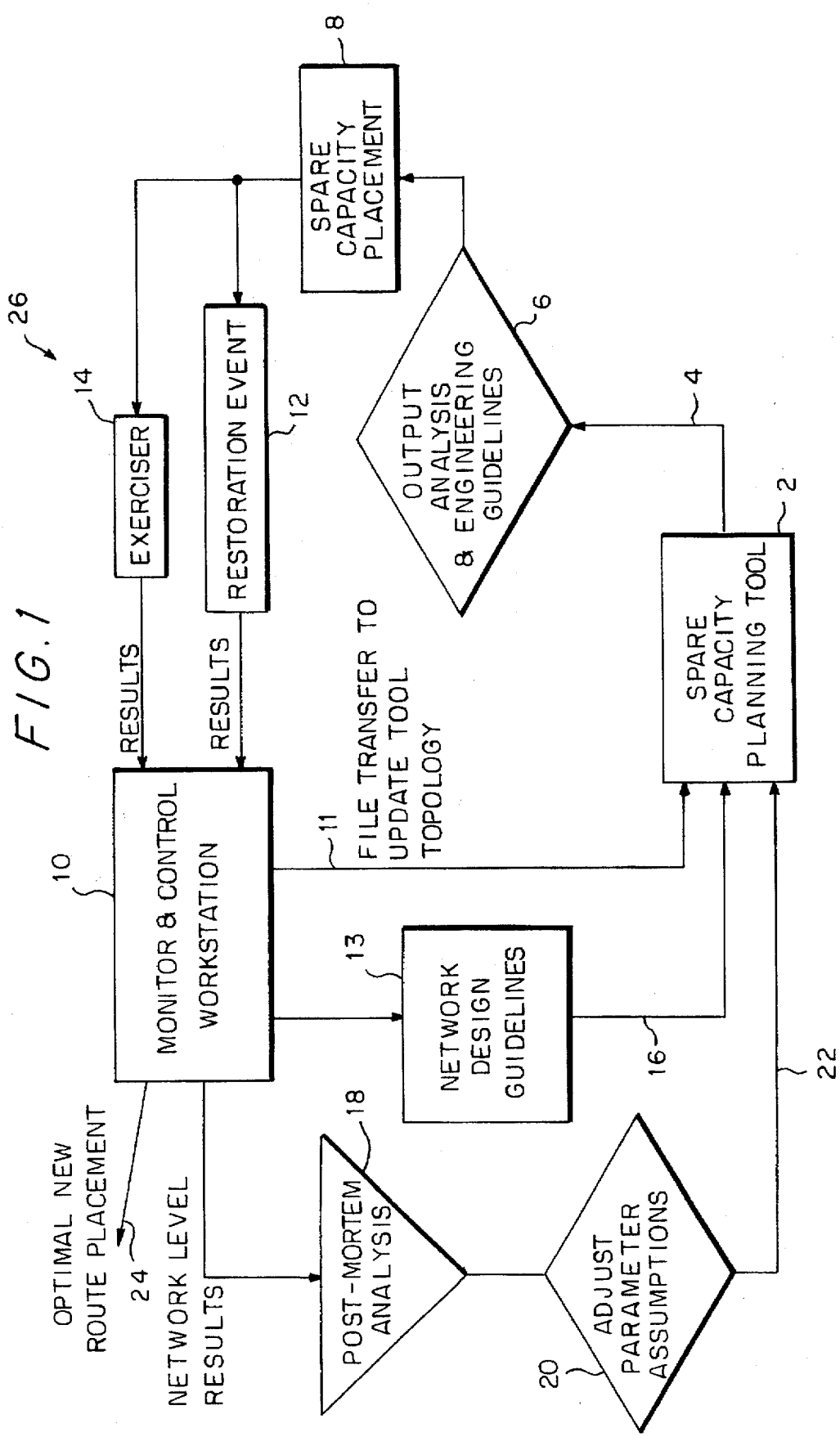
FIG. 1 is a block diagram illustrating the different components of the instant invention and their interconnections and interactions.

FIG. 1 is a simplified block diagram of the instant invention. As shown, a spare capacity planning tool 2, which may be an off-the-shelf network modeling tool that provides the basic platform for generating the topology of a communications network, incorporates its output via line 4 with some output analysis and engineering guidelines 6. The spare capacity planning tool 2, or variants thereof, is a network modeling tool being used by a number of companies such as TR Lab., British Telecom, Northern Telecom and other telecommunications companies. Tool 2 is a software package (used in a workstation) that emulates nodes, the interconnections of links or spans among the nodes, the processing of the nodes, the signalling between the nodes, node failures and other events that may happen to a communications network. Thus, if a given number of nodes and links, as well as their locations and the traffic to be traveling therethrough, are provided thereto, tool 2 can put all that information together to generate a given network topology of nodes and links (both working and spare) for a predefined amount of traffic. Such a topology is given for example in FIG. 2 and designated 7.

To be able to generate the given topology, a number of predefined rules, design guidelines and assumptions are provided to tool 2. Such rules and guidelines may include the various alarm conditions and timers disclosed in the aforenoted referenced co-pending application having Docket No. RIC-95-005. Thus, tool 2, upon receipt of the various inputs of nodes, links and traffic, and taking into consideration the design criteria provided thereto, generates a given topology of a network with the predefined analysis and engineering guidelines. This given topology is routed to a spare capacity placement tool 8 which may be considered for this invention as simply the provisioning, implementation or construction of the network in accordance with the topology output from tool 2.

Figure 2:
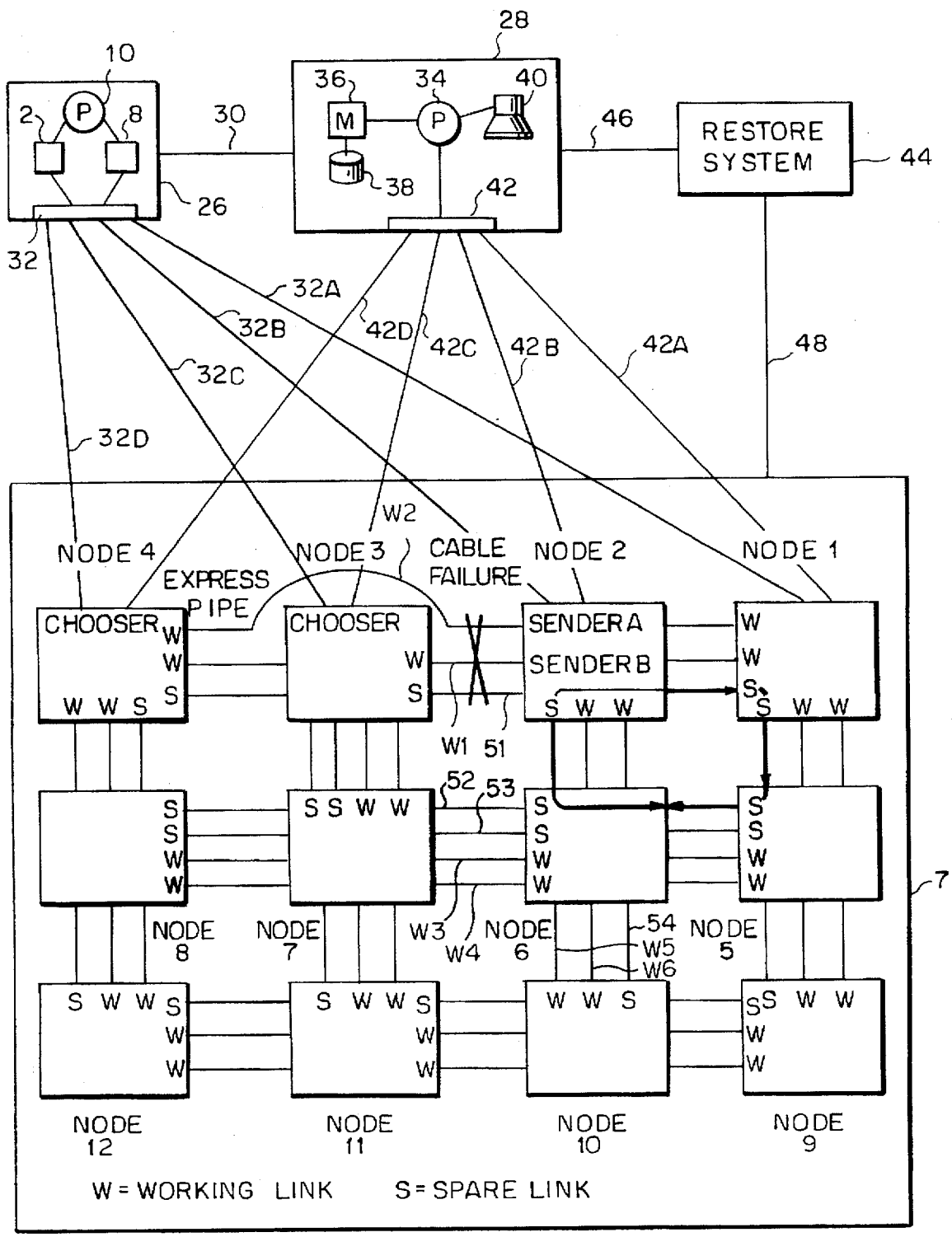
FIG. 2 is an overall view of the instant invention controlling the spare capacity of an exemplar network topology of interconnected nodes.

For example, in the exemplar network topology 7 of FIG. 2, nodes 1–12 are shown to be interconnected by various links. For instance, there are one working link W1 and one spare link S1 connecting nodes 2 and 3. Another working link W2, otherwise may be referred to as an express pipe or glass through, connects nodes 2 and 4. There is no spare link connecting node 2 to node 4. A further illustration of the network topology 7 is the connection of two spare links S2 and S3, as well as two working links W3 and W4, between nodes 6 and 7. It can further be seen that there are two working links W5 and W6, but only one spare link S4, connecting node 6 to node 10. Thus, as illustrated by the exemplar network topology 7 of FIG. 2, based on the output from spare capacity planning tool 2, with respect only to the nodes that were discussed, one spare link (S1) is placed between nodes and 3, none between nodes 2 and 4, two (S2, S3) between nodes 6 and 7 and one (S4) between nodes 6 and 10. This placement of spare links, as mentioned before, is dependant on the amount of traffic traversing, or deemed to be traversing, through the various nodes of the network.

The placement of the spare capacity for the various nodes is furthermore dependent on the traffic density between two adjacent nodes. For example, a greater spare capacity is provided for nodes along the east coast where telecommunications traffic is relatively heavy, while a moderate to low spare capacity is provided for nodes in the plains area such as between the Dakotas. For the discussion of the instant invention, each node of the network is assumed to comprise a digital cross-connect switch (DCS) such as the model 1633-SX made by the Alcatel Networks Systems, Inc.

A further component of the instant invention is a controller, identified in FIG. 1 as a monitor and control workstation 10. For the instant invention, controller 10 could be a Sun Sparc type workstation. Controller 10 is a centrally located computer that gathers all of the information coming from each of the nodes of the network so that it knows all goings on within the network. In other words, for the instant invention, controller 10 has knowledge of the different connections between the various nodes in terms of the number of working and spare links connecting adjacent nodes, whether a link is in alarm, as for example when there is a failure or malfunction at that link, and the routing of the traffic through the various communications paths of the network. Putting it differently, controller 10 monitors the results of the placement of the spare capacity by placement tool 8 in terms of how the placement of the spare capacity affects the rerouting of traffic for alternate routes or alt routes created in response to a failed link or span between a custodial pair of sender and chooser nodes.

The results provided to controller 10 may be from an actual restoration event subsequent to the occurrence of a failure, such as the cable failure shown in network 7 of FIG. 2. Such restoration event is identified as 12 in FIG. 1. On the other hand, a result may be provided to controller 10 by means of a tool such as for example an exerciser 14 identified in FIG. 1. Exerciser 14 is a tool that works through a restoration event in response to a simulated failure in the nodes which may be provided by the management of the network. In essence, exerciser 14 replaces an actual restoration event. This is required for the instant invention insofar as the environment of the topology of the network is constantly changing, as different cross-connections within the nodes and connections between the nodes are effected at various times, as for example during different times of the day. Thus, simulated restoration events are provided to exerciser 14 periodically so that results from restorations in response to simulated failures are provided to controller 10 so that controller 10 can continuously maintain an updated perspective of the network. Exerciser 14 begins its operation upon receipt of a command from either controller 10 or central operational processor controlled by the network management.

Upon receipt of each result from either exerciser 14 or restoration event 12, controller 10 has three options. Firstly, controller 10 could send out revised network design guidelines, indicated as 13, via line 16 to spare capacity planning tool 2. Secondly, controller 10 can perform a postmortem analysis 18. Thereafter, the previously assumed parameters, or parameter assumptions, are adjusted, as indicated by block 20, and fed by controller 10 to spare capacity planning 2 via line 22. Finally, controller 10 could automatically send out a file to spare capacity planning tool 2 to directly update the topology of the network via line 12. A more thorough discussion of each of the three options that controller 10 has will be given, infra.

At the same time, what is perceived to be the optimal routing topology is effected by controller 10 to the network via line 24. To achieve this, controller 10 sends out various command to each DCS of the network to change its matrix and port cross-connections.

The interrelationship and interaction between the system of FIG. 1, its network management and the restoration system are shown in FIG. 2. In particular, the FIG. 1 system, designated 26, is shown to be connected to a central network management center or Operations Support Center (OSS) 28 by a bi-directional connection 30. System 26 is shown to include controller 10, spare capacity tool 2 and the construction function represented by spare capacity placement tool 8. An unit 32 in system 26 provides interfacing between planning tool 2, spare capacity placement tool 8 and controller 10 with the nodes of exemplar network 7. For the sake of simplicity, only nodes 1–4 are each shown to be connected to system 26 via lines 32a, 32b, 32c and 32d, respectively. Although not shown as such, the other nodes of network 7 are each likewise connected to system 26, via interface unit 32.

Central management system 28 connected to system 26 via connection 30 includes a central processor 34, its associated working memory 36 and a database 38. Further connected to central processor 34 is a terminal 40 that enables the management of the network to interface with processor 34. There is also provided in network management system 28 an unit 42 for interfacing with each of the nodes of network 4. Again, for the sake of simplicity, only nodes 1 through 4 are shown to be connected to network management system 28 via lines 42a, 42b, 42c, and 42d respectively. As noted above, central processor 34 can output a command to exerciser 14 to have the latter begin a simulation distributed restoration event.

To enhance understanding of the instant invention, a distributed network restoration system (DNR), represent by block 44, is shown to be connected to network management system 28. Of course, in actuality as disclosed in the aforenoted referenced application having docket number RIC-95-005, the intelligence of DNR 44 is distributed among the nodes of network 7. But for the discussion of the instant invention, this restoration is represented as a distinct system that effects restoration of traffic for the network. In any event, system 44 transceives data to/from system 28 via line 46, and controls the restoration of traffic resulting from realfunctioned links or nodes within the exemplar telecommunications network 7, via line 48.

In operation, the present invention system 26, per its spare capacity planning tool 2, generates a potentially desirable capacity plan for the placement of the spare links connecting the various nodes of the network 7. This first planned spare capacity in network 7 is constructed by allocating various spare links among the nodes, as represented by placement tools. In the event of a failure, such as for example the cable failure between nodes 2 and 3, and also between nodes 2 and 4 shown in FIG. 2, restoration process is performed in the network to find the alternate route(s) for rerouting the traffic to bypass the failed working links W1 and W2. Such restoration process may be gleaned from the aforenoted referenced application having docket number RIC-95-005.

Figure 3:
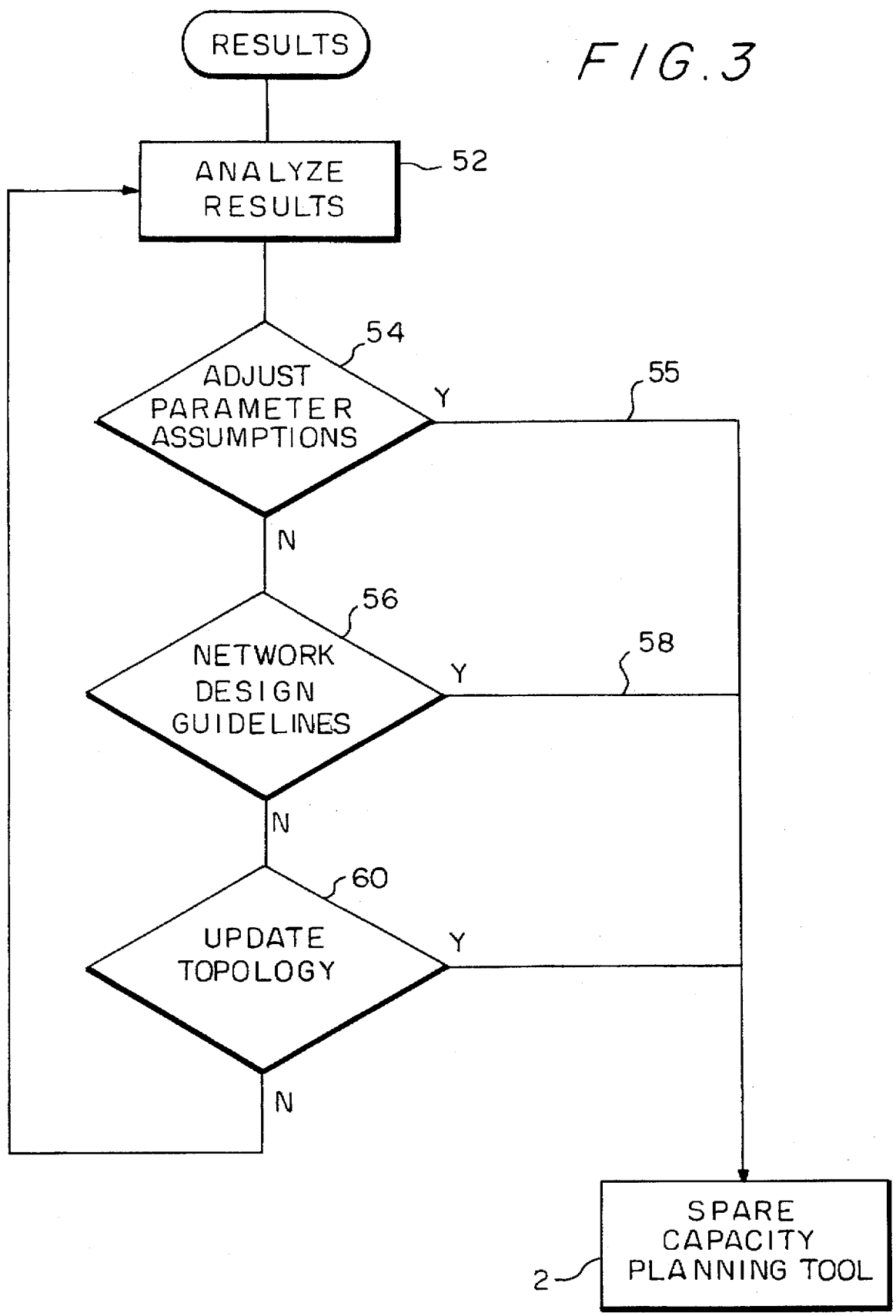
FIG. 3 is a flow chart illustrating the steps to be taken by the controller of the instant invention in deciding on the type of feedback to be provided to the network modeling tool of the system.

After the restoration event, controller 10 of system 26 reviews the result and determines how best to update the topology of the network for an optimal usage of the now remaining spare capacity. However, it should be noted that once the failed cable has been repaired, the topology of the network should be returned to the way it was before the failure. In that case, system 26 needs to update the then existing topology. But, for the instant discussion, given that the topology of the network has been changed as a result of a failure, the spare capacity of the network likewise needs to be adjusted. To achieve this, controller 10 of system 26 has to decide what kind of input is to be provided to spare capacity planning tool 2. The decision on which of inputs 12, 16, or 22 is to be provided to spare capacity planning tool 2 is discussed herein with reference to the flow chart of FIG. 3.

As shown, controller 10 first analyzes the received results per block 52. This is akin to the postmortem analysis 18 shown in FIG. 1 in which controller 10 examines the actual result obtained subsequent to a restoration event and compares it with a previously perceived result. Once the analysis is completed, a determination is made by controller 10 on whether to adjust the parameter assumptions, as indicated in block 54. Some of the assumptions that need to be taken into consideration by controller 10 may include the nodal processing delay which may affect the time it takes for a restoration event to be completed. For example, as discussed in the aforenoted referenced application having docket number RIC-95-005, the various flooding, acknowledge and reverse messages take time to traverse among the nodes for establishing alt-routes. Another parameter assumption is the variance of the nodal processing delay. In other words, even though there is a nodal processing delay, that delay in fact does vary and the standard deviation of delay variance also needs to be considered as a key parameter assumptions. Yet another parameter that has to be assumed and adjusted is the throughput speed for a message or signal to travel on the links between the nodes. Even though the messages have been determined to have a particular protocol and to travel at a given speed, the speed for different messages in practice does change. Other parameter assumptions include the timer values mentioned in the referenced application for controlling the restoration process having docket number RIC-95-005.

Once the parameter assumptions are altered, they are input to spare capacity planning tool 2 via line 55. If, however, controller 10 determines that the parameter assumptions do not need to be adjusted, then whether the network design guidelines are still applicable is determined. This is done in decision block 56. Some of the network design guidelines to be taken into consideration are patching policy, provisional rules, link type, and interface type.

In brief, network design guidelines are rules that are required in order for the network to operate coherently. A patching policy refers to the kind of reconfiguration or cross-connections to be effected on the patch boards or patch panels of the DCS for establishing different routes for the network. There are different patching policies for different types of networks. For example, there is an optical carrier (OC-12) patching policy for a fiber optic DTNR network. Or there may be a DS-3 patching policy.

One of the provisional rules is whether a particular circuit can be used for different types of restoration platforms, for example the DTNR and realtime restoration (RTR) platforms both of which may be provided in the same DCS. Other provisional rules include whether certain ports in a DCS can be cross-connected to other ports, and whether or not certain port types can be made to mate with spare links, working links, etc.

The link and interface types of networking design guidelines are similar to the just mentioned interfacing between the different ports of the DCSs. If the network is a fiber optic network, a design guideline that is important is the use of synchronous optical network (SONET) transmission for a signalling link. If controller 10 determines that particular types of design guidelines are required, these design guidelines are provided to spare capacity planning tool 2 via line 58.

The adjusted parameter assumptions and network design guidelines can be input separately by controller 10 to spare capacity planning tool 2. To speed up the process, controller 10 can automate both the network design guidelines and parameter assumptions so that the changes that controller 10 makes are automatically routed by controller 10 to spare capacity planning tool 2 via line 12 (FIG. 1) or via block 60. In case the adjustments of the topology of the network are done directly by means of a file transfer from controller 10 to spare capacity planning tool 2. This automatic updating of the topology is based on the end analysis, pre-analysis or anticipated analysis of the results.

Even though the routing of data from controller 10 to spare capacity planning tool 2 has been described as being performed by controller 10 up to this point, it should be appreciated that the network level results analyzed postmortemly can in fact be manually done by engineers of the network who may best be able to impart a different perspective on the postmortem analysis.

Once spare capacity planning tool 2 has received either the adjusted parameter assumptions or the updated design guidelines, it incorporates its output to any other engineering guidelines 6 (FIG. 1) that may alter its output. For example, some of the guidelines that affect the output from tool 2 include economic guidelines such as the placement of a maximum number of spare links (or a minimum number of spare links) between adjacent nodes. Other engineering factors and technological factors may also need to be taken into consideration.

The actual allocation of the spare capacity is done by capacity placement tool 8. The newly configured network thereafter waits for the next fault and its subsequent restoration results.

Since the topology of network 7 is dynamic, in order to maintain an optimal amount of spare capacity for the network, the allocation of the spare links throughout the network is continually updated. But in order to update the allocation of the spare capacity within the network, results from restoration events are required. Yet restoration events are hopefully not too frequent. Accordingly, in order to update the topology of the network more frequently, simulation restoration events are generated by exerciser 14 and provided to controller 10 on a periodic basis. The more simulation events exerciser 14 generates, the more results are provided to controller 10 and the estimation of the optimal amount of spare capacity for the network becomes better and more refined.

Inasmuch as the present invention is subject to many variations, modifications and changes in detail, it is intended that all matter described throughout the specification and shown in the accompanying drawings be interpreted as illustrative only and not in a limiting sense. Accordingly, it is intended that the present invention be limited only by the spirit and scope of the herein appended claims.

We claim:

1. Apparatus for estimating an optimal amount of spare capacity to be provided for and allocated within a telecommunications network so that efficient distributed restoration of traffic may be effected on said network if a disruption of traffic occurs between at least two adjacent nodes of said network, comprising:

network modelling tool means having predetermined engineering and design guidelines for calculating the amount of spare capacity required for said network if said network is defined to have a given topology of nodes and links and a predefined amount of traffic traversing therethrough;

implement means for provisioning said calculated amount of spare capacity to appropriate locations of said network;

control means for monitoring and determining whether said provisioned spare capacity provides for an efficient distributed restoration of traffic in said network when a traffic disruption fault occurs in said network, said control means providing a feedback to said network modelling tool means to enable said tool means to recalculate said amount of spare capacity required to obtain said optimal amount of spare capacity for said network if said control means determines said previously provisioned spare capacity fails to provide for said efficient distributed restoration of traffic.

2. Apparatus of claim 1, wherein said control means provides as said feedback to said network modelling tool means at least adjusted assumed parameters, network design guidelines and data to enable said network modelling tool means to update said given topology.

3. Apparatus of claim 2, wherein said adjusted assumed parameters comprise:

nodal processing delays;

throughput speed on signalling circuits between nodes; and values of various timers for controlling the process of said distributed restoration of traffic.

4. Apparatus of claim 2, wherein said network design guidelines comprise:

patching policies of said network;

provisioning rules of said network; and the type of said links in said network.

5. Apparatus of claim 1, further comprising:

exerciser means, in response to a simulated restoration event, for determining whether said calculated amount of spare capacity does provide for said optimal amount of spare capacity in a distributed restoration event in response to a simulated fault.

6. Apparatus of claim 1, further comprising: means interfacing with said distributed restoration of traffic for transmitting the result of said restoration in response to said fault in said network, said control means utilizing said result to determine whether said calculated amount of spare capacity is said optimal amount of spare capacity for said distributed restoration.

7. Apparatus of claim 5, wherein said exerciser means begins operation upon receipt of a command from either said control means or a central operations means to simulate a distributed restoration event.

8. Method of estimating an optimal amount of spare capacity to be provided for a telecommunications network for effecting efficient distributed restoration of traffic in said network if a disruption of traffic occurs between at least two adjacent nodes of said network, comprising the steps of:

(a) providing predetermined engineering and design guidelines for said network to a modelling tool means;

(b) defining said network to have a given topology of nodes and links and a predefined amount of traffic traversing therethrough;

(c) calculating the amount of spare capacity required for said network;

(d) provisioning said calculated amount of spare capacity to appropriate locations of said network;

(e) monitoring and determining whether said provisioned spare capacity provides for an efficient distributed restoration of traffic in said network when a traffic disruption fault occurs in said network; and (f) providing a feedback to said network modelling tool means to enable said tool means to recalculate said amount of spare capacity required to obtain said optimal amount of spare capacity for said network if said previously provisioned spare capacity fails to provide for said efficient distributed restoration of traffic.

9. Method of claim 8, wherein said step (f) further comprising the step of:

providing as said feedback to said network modelling tool means at least adjusted assumed parameters, network design guidelines and data to enable said network modelling tool means to update said given topology.

10. Method of claim 8, further comprising the steps of:

simulating said traffic disruption fault; and determining whether said calculated amount of spare capacity does provide for said optimal amount of spare capacity in a simulated distributed restoration event in response to said simulated fault.

11. Method of claim 8, further comprising the steps of:

transmitting the result of said distributed restoration of traffic of said system in response to said fault in said network; and utilizing said result to determine whether said calculated amount of spare capacity is said optimal amount of spare capacity for said distributed restoration.

12. Method of claim 8, further comprising the step of:

effecting optimal placement of available spare links between adjacent nodes.

13. Method of claim 10, further comprising the step of:

exercising a distributed restoration event in response to said simulated traffic disruption fault upon receipt of a command from a control means.

* * * * *